United States Patent [19]

Bogue et al.

[11] 4,050,655
[45] Sept. 27, 1977

[54] CARGO LOADING METHOD AND APPARATUS

[75] Inventors: Robert Edgar Bogue, Seattle; Donald Keith Jones, Bellevue; Ray Vere Riggs, Seattle; Bruno Joseph Vogele, Kirkland, all of Wash.

[73] Assignee: The Boeing Company, Seattle, Wash.

[21] Appl. No.: 691,650

[22] Filed: June 1, 1976

[51] Int. Cl.² ............................................. B64C 1/22
[52] U.S. Cl. ............................ 244/137 R; 244/118 R
[58] Field of Search ................ 244/118 R, 137 R; 198/411, 415, 416, 787; 214/84

[56] References Cited
U.S. PATENT DOCUMENTS

| 2,526,856 | 10/1950 | Dunn et al. | 198/415 |
| 3,592,328 | 7/1971 | Sapp | 198/415 |
| 3,709,450 | 1/1973 | Watts et al. | 244/118 R |
| 3,978,975 | 9/1976 | Herbes et al. | 244/137 R |

*Primary Examiner*—Trygve M. Blix
*Assistant Examiner*—Barry L. Kelmachter
*Attorney, Agent, or Firm*—Laurence A. Savage; Bernard A. Donahue; Robert W. Jenny

[57] ABSTRACT

The disclosed method and apparatus enables movement of containerized and palletized cargo into a cargo aircraft through a door in the side of the fuselage which has a smaller width than the length of the cargo. The disclosed preferred embodiment includes an array of floor mounted steerable drive wheel units and an attenuated, shock absorbing pivot-stop.

2 Claims, 23 Drawing Figures

CARGO LOADING METHOD AND APPARATUS

BACKGROUND OF THE INVENTION

This invention relates to movement of containerized and palletized cargo into modern wide body cargo aircraft; and, more particularly to a method and apparatus for movement of such cargo through an aircraft door having a width substantially smaller than the length of the palletized cargo.

The need for mechanization of cargo movement is particularly acute in the field of air transported cargo. Cargo space is often a limiting factor and the mechanization allows better utilization of whatever cargo space is available since clearances to allow access for personnel can be reduced to a minimum. Utilization of the aircraft is enhanced because loading and unloading takes less time. This is important because of the relatively high cost of "down-time" for airplanes. Also, a prime asset of carrying cargo by air is the time saved and therefore any saving in handling time is of importance.

Some airplane designs are dedicated to air cargo carrying and these airplanes usually provide "straight in" access to the cargo volume through the nose or tail of the fuselage to achieve the optimum conditions for rapid, automated loading and unloading. However, on some route structures the most economical approach is to use an airplane which carries both passengers and cargo. The cargo carrying role of these airplanes does not justify the expense and complication of nose and/or tail access and, also, the passenger compartment can interfere with straight in loading and unloading. Therefore, side-of-body cargo doors are provided. Furthermore, in some cases there are economic advantages to be gained by using side cargo doors along with nose and/or tail access. These doors provided added unloading and loading capability and facilitate the partial loading and unloading occasioned by multi-stop routes.

Another facet important to the economics of shipping containerized and palletized cargo is that shifting from one mode (like ship) to another (like air) should not involve the time and expense of taking the cargo from the ship's containers (or pallets) for the airplane. In other words, the containers and pallets are used interchangeably on all modes of transport. These standardized containers are 8 feet wide and their lengths are in multiples of 10 feet; i.e. 10 feet, 20 feet, 30 feet and 40 feet.

The "8 by 20" containers are in common use today. On the above-mentioned airplanes, which use side cargo doors and cargo bays slightly wider than two containers width (16 +), loading and unloading 8 foot by 20 foot containers presents a problem. The 10 feet pluse door width prevents loading the container sidewise and providing doors 20 feet plus wide is structurally unacceptable. In any event, only a portion of the cargo requires such width. Also, loading the container laterally onto the aircraft presents problems because its 20 foot length exceeds the 16 foot plus width of the cargo floor. The subject invention solves this problem. Furthermore, as required by practical and economic factors, it does so with a minimum of additions and modifications of apparatus and controls already provided for handling the eight foot by ten foot cargo units.

OBJECTS OF THE INVENTION

A primary object of this invention is to provide handling capability aboard an airplane for loading cargo units 8 feet wide and 20 feet long onto a cargo about 16 feet wide through a side-of-body cargo door slightly more than 10 feet wide. Achieving this object will avoid the need to repack the contents of twenty foot long cargo units into or onto 10 foot long units.

It is a further related object of this invention to achieve the above primary object with a minimum of modification to equipment already in the airplane for handling 10 foot long units.

SUMMARY OF THE INVENTION

An array of retractable/extendible, reversible rotation, 90° steerable cargo drive wheel units are mounted in the cargo floor at appropriate locations in the vicinity of the side cargo door. A key item of equipment is an attenuated, shock absorbing pivot-stop attached to the cargo floor close to the juncture of the edge of the floor and the forward edge of the cargo door opening. By appropriate programming of the drive units a 20 foot long unit is loaded on-board in steps comprising (1) moving it laterally into the airplane across the floor, and then (2) driving the unit longitudinally (forward). The side of the unit is restrained from forward motion by the pivot-stop but the most inboard end continues to move, so that the unit pivots about the pivot-stop enough that it engages additional drive units which then (3) move the most inboard (now becoming most forward) end laterally while the other end (now becoming aft) continues to pivot against and around the pivot-stop. The unit finally is moved against the door side edge of the cargo floor, aligned with its 20 foot dimension parallel to the airplane longitudinal center line. The unit can then be positioned as desired in the cargo bay, using conventional techniques with the existing equipment, to complete the loading. Unloading is essentially the reverse except that the directions of steering, direction of rotation and times of operation of the cargo drive units are different.

BRIEF DESCRIPTIONS OF THE DRAWINGS

FIG. 3 through 13 each illustrate setting of the power drive units for maneuvering the cargo units as follows:
FIG. 3 Load Normal
FIG. 4 Load Enable
FIG. 5 Unload Enable
FIG. 6 Unload Align
FIG. 7 Unload Normal
FIG. 8 Load Forward — Left Side
FIG. 9 Lateral — Left to Right
FIG. 10 Load Forward — Right Side
FIG. 11 Unload Aft — Right Side
FIG. 12 Unload Lateral — Right to Left
FIG. 13 Unload Aft — Left Side.

DETAILED DESCRIPTION OF THE METHOD AND APPARATUS

Figure 1:
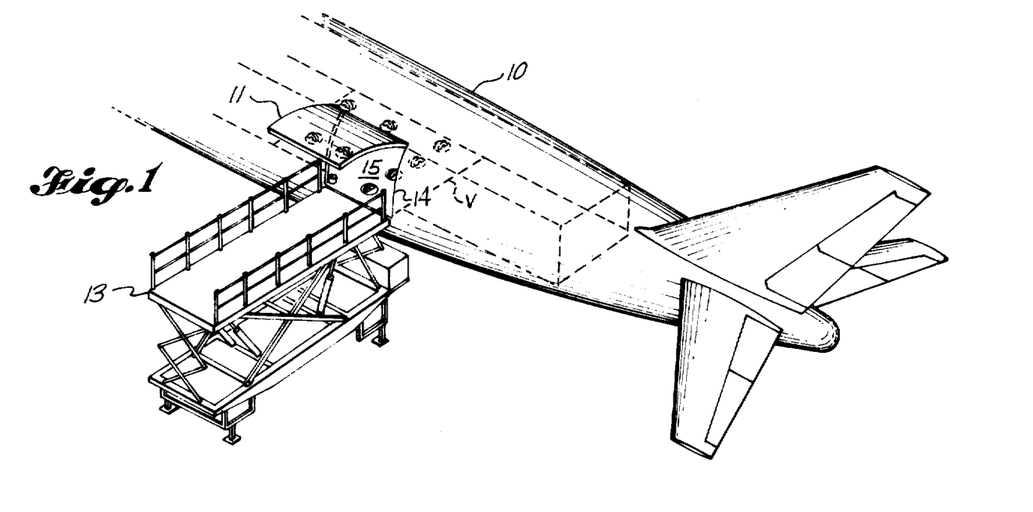
FIG. 1 is a perspective view showing a cargo airplane with a side cargo door with appropriate equipment for loading through the side cargo door.

An airplane of the type on which the subject method and apparatus would be used is shown in FIG. 1. The airplane 10 is fitted with a cargo door 11 on the left side of its fuselage, located aft of the wing to permit access by the cargo handling ground equipment 13. The door is open and, through doorway 14 a portion of the cargo floor 15 in the airplane can be seen. Typical cargo units are of a standardized width of eight feet and come in lengths of 10 feet, 20 feet, etc., these two sizes only being of interest in this description. The standard arrangement for units loaded on an airplane is end-to-end in rows, the length dimension being lengthwise in the airplane and there being two rows if airplane size permits. This discussion relates primarily to airplanes sized to accommodate two rows side-by-side closely spaced about the longitudinal center line of the cargo floor. The floor is wide enough to permit personnel to have longitudinal access along the fuselage between the units and the side portions of the fuselage structure. Also, there is space for control panels, handling equipment, etc.

As shown in the U.S. Pat. No. 3,741,504, typical prior art on-board cargo handling equipment includes guides for helping in positioning the cargo, locks for holding it in place, passive casters and rollers for reducing the forces required to move the units and powered drive rollers on units (PDU's) for moving the units in the airplane. The PDU's in the airplane section indicated by bracket V are specialized for handling side-loaded cargo. These PDU's are steerable 90° so that they can move the units into and across the airplane and then be retracted, steered 90°, and used to move units along the cargo floor to make room for additional units moving into the V section for loading. Action for unloading is in the opposite sequence. These specialized PDU's are the subject of U.S. Pat. application Ser. No. 591,974, now U.S. Pat. No. 3,978,975 assigned to The Boeing Company, the assignee of this patent application.

Figure 2:
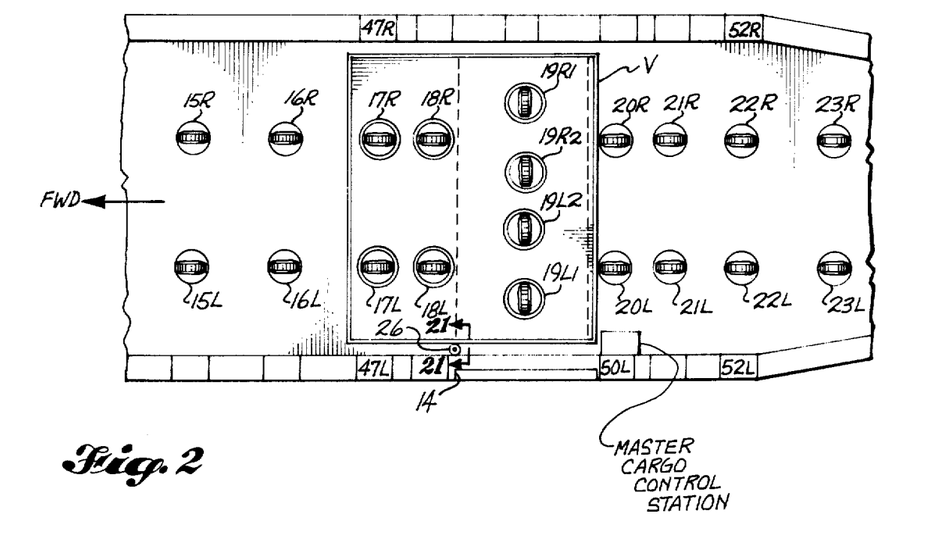
FIG. 2 is a schematic of the aircraft cargo floor showing the power drive units and control stations.

FIG. 2 is a schematic elevation view of section V of the airplane. The cargo floor area of section V is designated by the dotted lines. The area is about 16 feet wide (i.e., twice the width of a standard unit) and a little over 20 feet long (i.e., twice the length of the shortest standard unit). The area is identified as having two bays each about 10 feet long: the 19 bay and the 17/18 bay. Doorway 14 is indicated and PDU's 19L1, 19L2, 19R2 and 19R1 are disposed across the cargo floor essentially in line with the center of doorway 14. PDU's 17L, 18L, 17R and 18R are located essentially in the middle of the left and right sides of the floor respectively and located to be about evenly spaced longitudinally from each other and the forward and aft extremes of the 17/18 bay.

All the apparatus described to this point has been used for handling the standard 8 foot by 10 foot cargo units. The apparatus and methods described below adapted such basic equipment to handle the 20 foot long as well as the 10 foot long units.

Figures 21, 23:
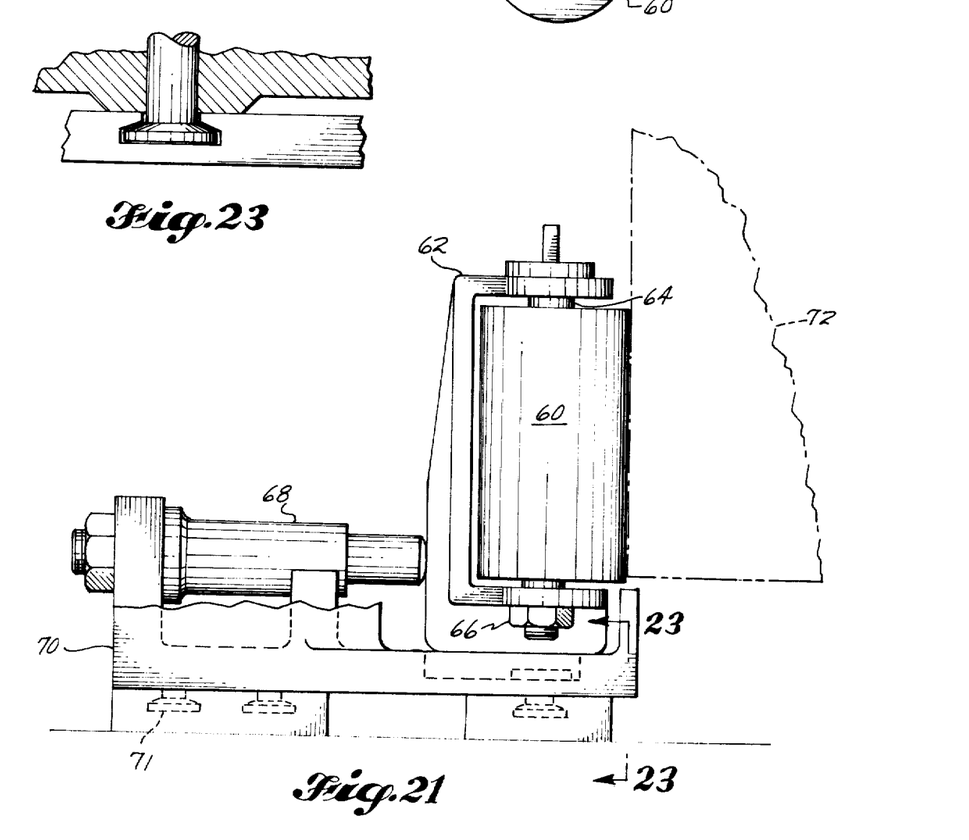
FIG. 21 is a side elevation view, of the attenuated shock absorbing pivot-stop of the cargo apparatus.
FIG. 23 is a sectioned elevation view taken along line 223—23 in FIG. 21 showing the T-Bolt in the slot for limiting the outboard motion of the pivot-stop.

Pivot-stop 26 is located just forward of the forward edge of doorway 14 and just to the left of the left edge of the cargo floor area of section V. FIG. 21 is a side elevation view of pivot-stop 26, taken at 21—21 in FIG. 2. The stop is high enough to fully engage the edge of the base of a cargo unit (or the edge of a cargo pallet), to prevent the unit (or pallet) from contacting the doorway 14 and to provide a "point of rotation" or pivot as a cargo unit is realigned as explained later.

Figure 22:
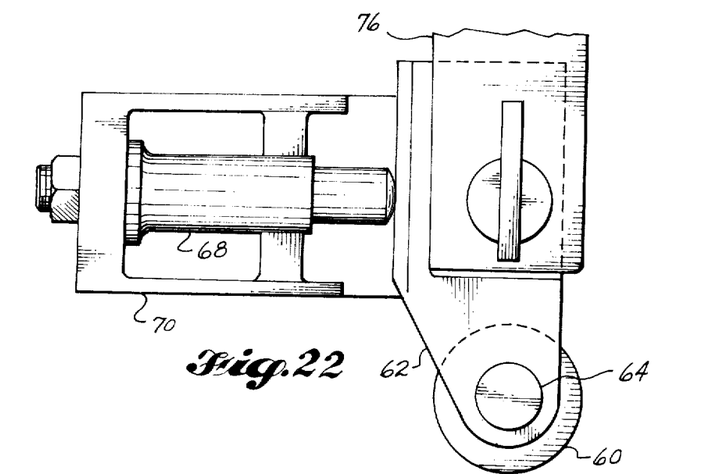
FIG. 22 is a plan view of the attenuated shock absorbing pivot-stop.

As shown in FIGS. 21 and 22, a roller 60 is secured to a channel bracket 62 by a shaft 64 and nut 66. An attenuator 68 is attached to a rail support member 70, and is in contact with bracket 62. Support member 70 is secured to the deck structure by circular button securing means, a standard aircraft cargo securing device 71. Motion of bracket 62 outboardly upon impact loadings from the containers 72 is dampened by attenuator 68. Outboard motion of bracket 62 is controlled by the T-bolt and slot combination shown in FIG. 23. As shown in FIG. 22, bracket 62 is secured to an inboardly extending outboard guide rail 76. Guide rail 76 is pivotally mounted (not shown) with respect to the cargo floor to allow the required differential motion between roller 60 and attenuator 68.

Whereas the method for loading and unloading eight foot by ten foot units was to load them sidewise through the 10 foot plus wide door, using all rectilinear motions, the method for the 20 foot long units involves inserting and removing them with their long dimension at right angles to the longitudinal axis of the airplane along with turning them 90° after insertion and before removal.

Figure 3:
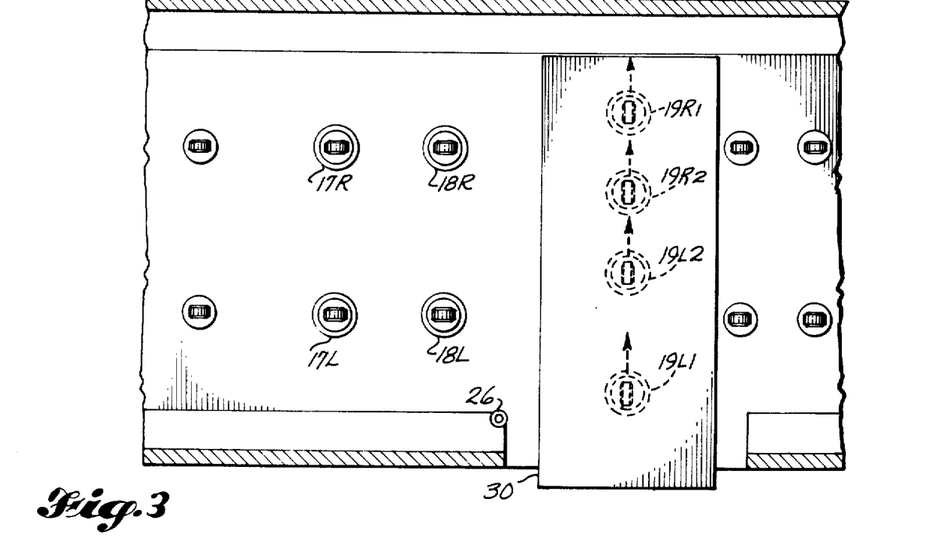
Figure 4:
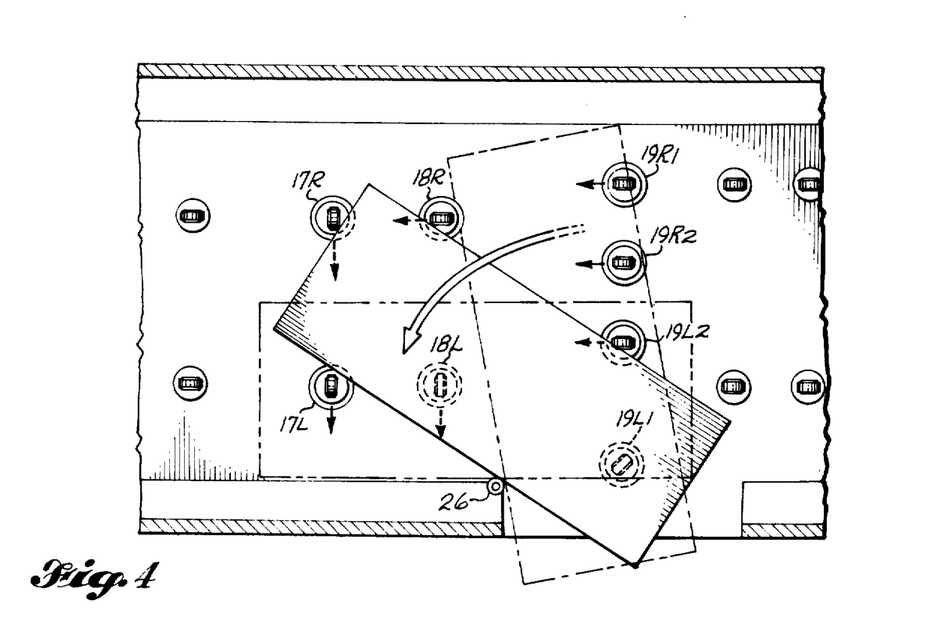

The loading method is shown on FIGS. 3 and 4. In FIG. 3 the unit 30 indicated by the dark-lined rectangle has been moved onto the airplane from a loader by aligning all four 19 PDU's at 90° to the airplane center line (steer 90°) and rotating their drive wheels in the direction indicated by the arrows next to each one. This rotation would produce an aft motion if the drives were in their fore and aft orientation. TABLE 1, set forth below, lists the seven basic commands of the PDU system. Because the PDU's are set up the same for Lateral — Left to Right and Lateral — Right to Left as for Load-Normal and Unload-Normal respectively, and because Load-Forward and Load-Aft set-up are the same regardless of whether a unit is on the right or left side, the entire eleven commands of FIGS. 3 through 13 can be digested to the seven shown in TABLE 1.

TABLE 1

20 FOOT CARGO CONTROL PDU COMMANDS

| COMMAND SIGNALS | | PDU's - GROUP I | | | | PDU's - GROUP II | | | |
|---|---|---|---|---|---|---|---|---|---|
| | | 18L | 18R | 19L2 | 19R2 | 17L | 17R | 19L1 | 19R1 |
| 1. Load-Enable | STRG | 90° | 0° | 0° | 0° | 90° | 90° | 45° | 0° |
| | DRIVE | FWD | FWD | FWD | FWD | FWD | FWD | NONE | FWD |
| 2. Unload-Enable | STRG | 90° | 0° | 90° | 90° | 90° | 0° | 90° | 45° |
| | DRIVE | AFT | AFT | FWD | FWD | AFT | AFT | FWD | NONE |
| 3. Lateral - Right to Left (& Unload Normal) | STRG | 90° | 90° | 90° | 90° | 90° | 90° | 90° | 90° |
| | DRIVE | FWD | FWD | FWD | FWD | FWD | FWD | FWD | FWD |
| 4. Lateral - Left to Right | STRG | 90° | 90° | 90° | 90° | 90° | 90° | 90° | 90° |
| | DRIVE | AFT | AFT | AFT | AFT | AFT | AFT | AFT | AFT |

TABLE 1-continued

| | | 20 FOOT CARGO CONTROL PDU COMMANDS | | | | | | | |
|---|---|---|---|---|---|---|---|---|---|
| | | PDU's - GROUP I | | | | PDU's - GROUP II | | | |
| COMMAND SIGNALS | | 18L | 18R | 19L2 | 19R2 | 17L | 17R | 19L1 | 19R1 |
| (& Load Normal) | | | | | | | | | |
| 5. Unload-Align | STRG | 45° | 0° | 0° | 0° | 45° | 0° | 90° | 0° |
| | DRIVE | NONE | AFT | AFT | AFT | NONE | AFT | NONE | AFT |
| 6. FWD | STRG | 0° | 0° | 0° | 0° | 0° | 0° | 0° | 0° |
| | DRIVE | FWD | FWD | FWD | FWD | FWD | FWD | FWD | FWD |
| 7. AFT | STRG | 0° | 0° | 0° | 0° | 0° | 0° | 0° | 0° |
| | DRIVE | AFT | AFT | AFT | AFT | AFT | AFT | AFT | AFT |

FIG. 4 shows the cargo unit being rotated to align its length with the center line of the airplane and place it against the edge restraint on the left edge of the left lane of the cargo floor. It is during this step that the pivot-stop 26 protects the cargo unit and the edge of the doorway from each other. The command from the control system which sets up the drive units for this step is titled Load-Enable and is Command 1 on TABLE 1. Unit 19L1 is steered to the inactive (retracted) position; the remaining three 19 units are steered fore and aft (0°) and rotating forward; unit 18R is steered 0° and rotating forward; units 18L and 17R and 17L are steered 90° and rotating forward. The rotation of the unit is caused at first by the couple produced by the driving of 19R1, 19R2 and 19L2 and the restraint of the pivot-stop. Then the unit is engaged by 18R to continue producing a couple in combination with the pivot-stop restraint. The unit finally is engaged by 18L, 17R if it has moved far enough forward by 18R, and finally 17L, all continuing to produce the desired couple with the pivot-stop restraint force.

These two steps bring the unit on-board and align it so that conventional techniques can be used to position it wherever desired on the cargo floor.

Figure 5:
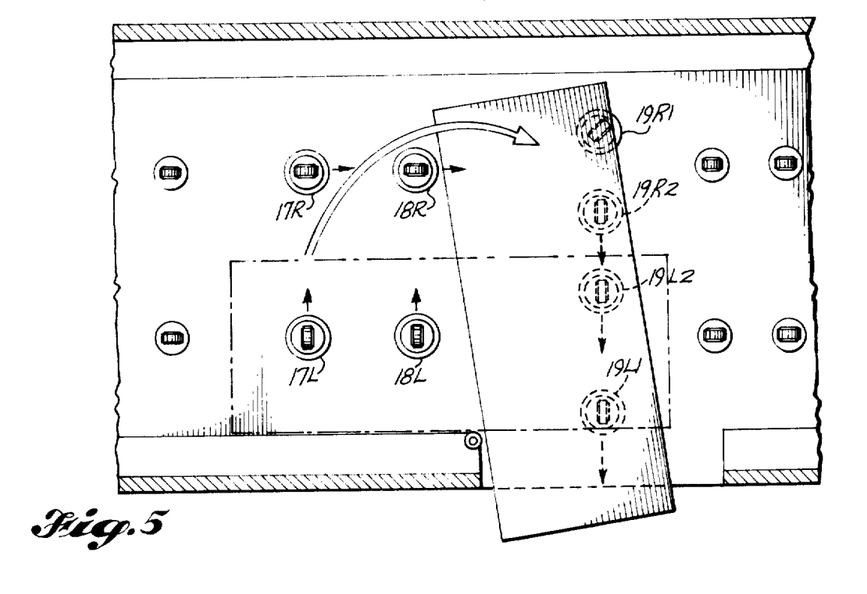
Figure 6:
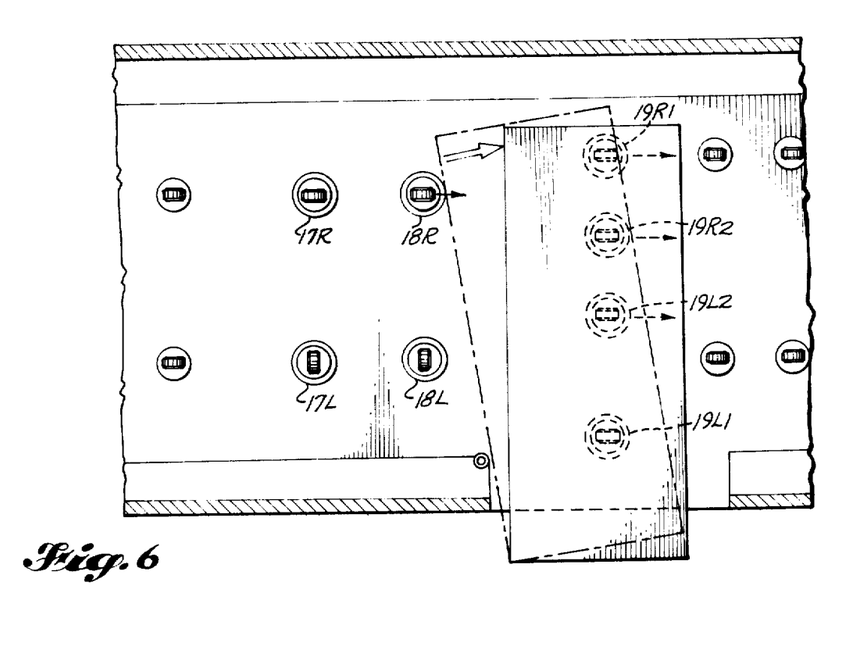
Figure 7:
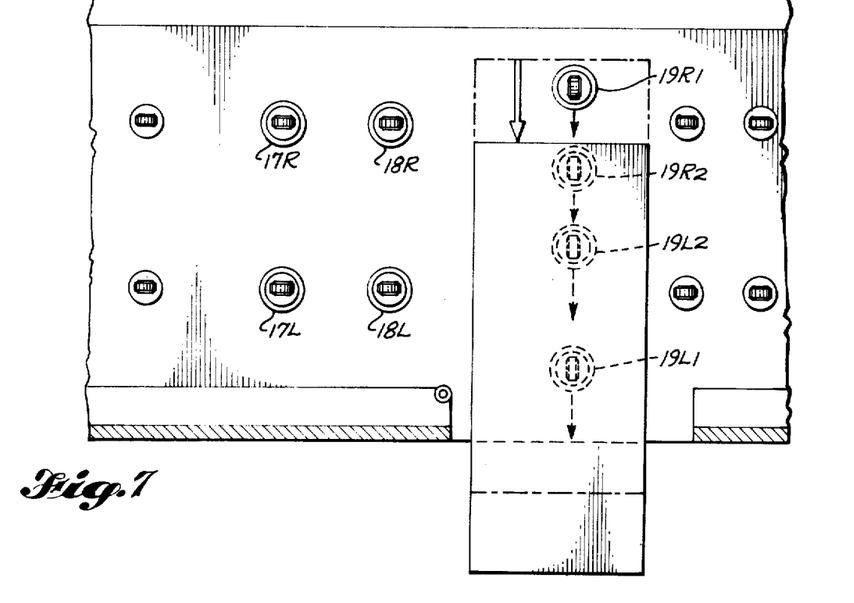

The method for unloading a 20 foot long unit comprises three steps, shown in FIGS. 5, 6 and 7 respectively. To begin, the cargo unit will have been moved by conventional techniques to the position indicated by the dashed lines in FIG. 5, i.e., against the left edge of the left lane of the cargo floor and with its aft end about 2 feet aft of the station of the 19 PDU's. Then, to unload, step 1 is to perform the Unload-Enable maneuver, Command 2 on TABLE 1, in which 17L and 18L are steered 90° and rotating "aft"; 17R and 18R are steered 0° and rotating "aft"; 19R1 is steered to the inactive (retracted) position; and 19R2, 19L2 and 19L1 are steered 90° and rotating outboard towards door. This maneuver swings the unit about the pivot-stop almost 90° but not in suitable alignment for unloading.

To achieve proper alignment for unloading the Unload-Align command, Command 5 on TABLE 1 is implemented, illustrated on FIG. 6. PDU's 18R, 19R1, 19R2, 19L2 are all steered 0° and rotating aft. This action moves the cargo unit from the dash-line position on FIG. 6 to the heavy black-line position. The unit is then ready for unloading, Command 3, TABLE 1, Unload-Normal. All four 19 PDU's are steered 90° and rotating outboard towards door. This action moves the unit off the cargo floor.

Figure 8:
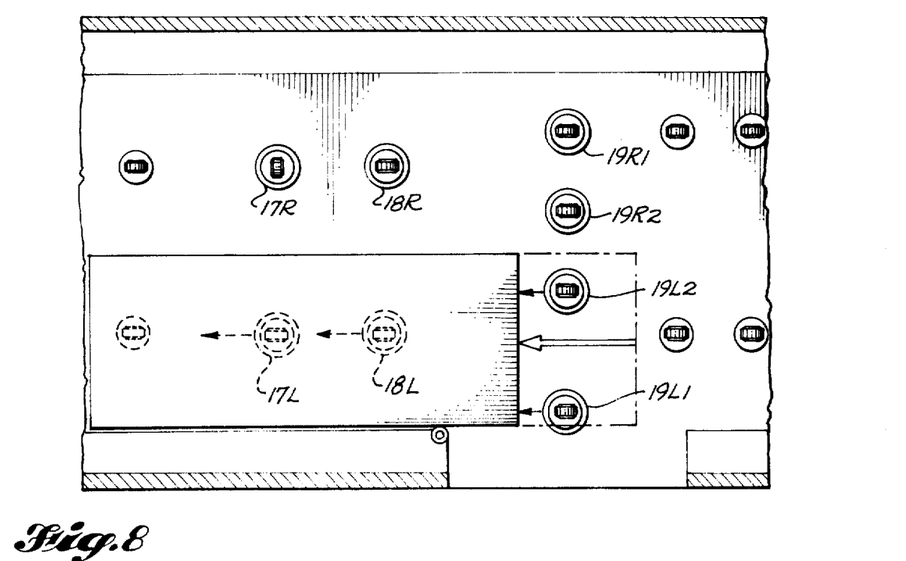
Figure 9:
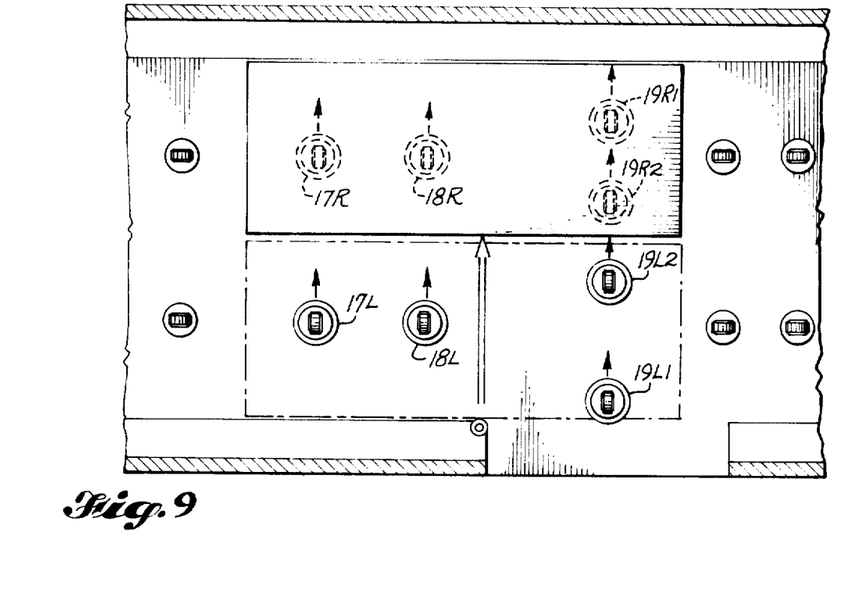
Figure 10:
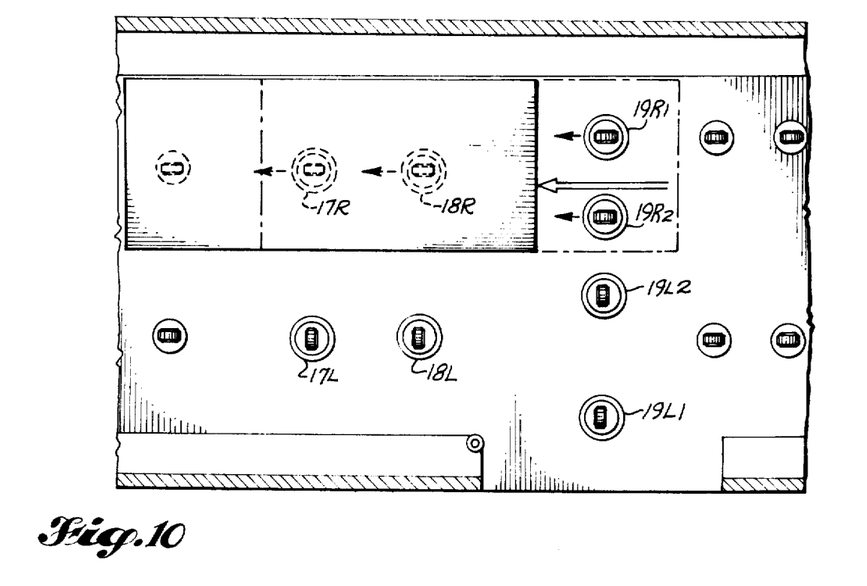
Figure 11:
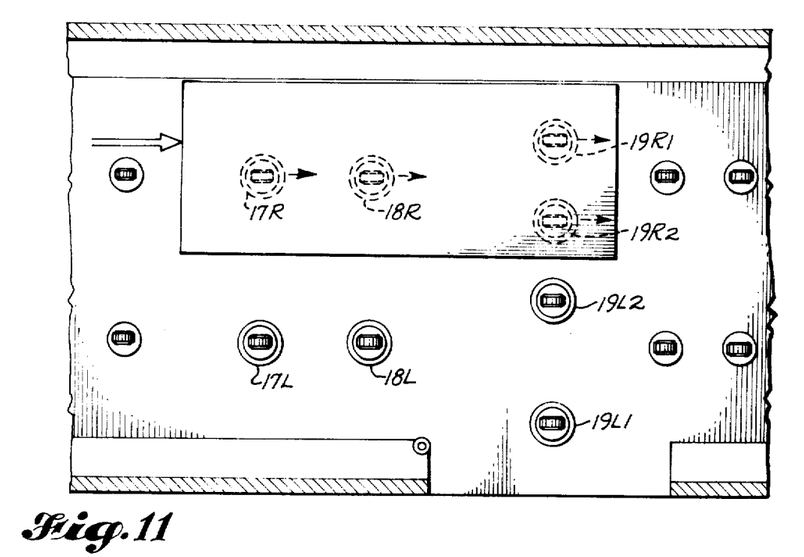
Figure 12:
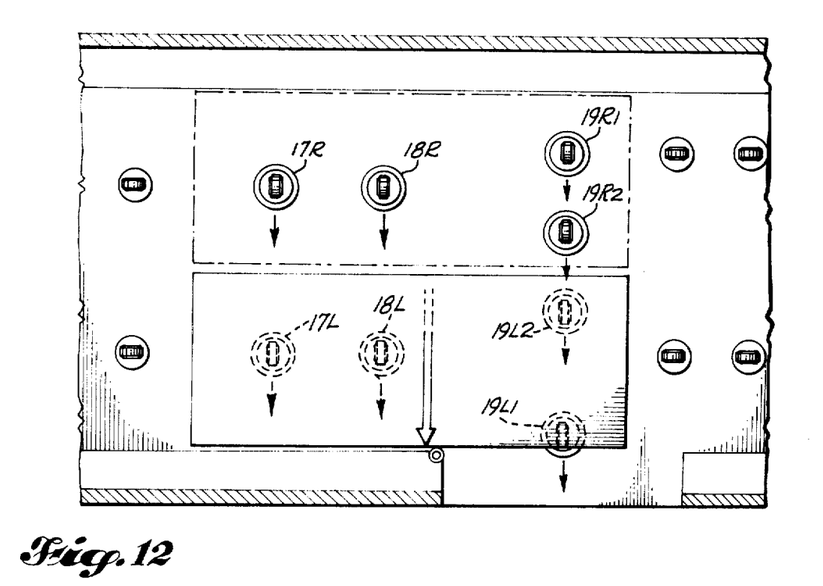
Figure 13:
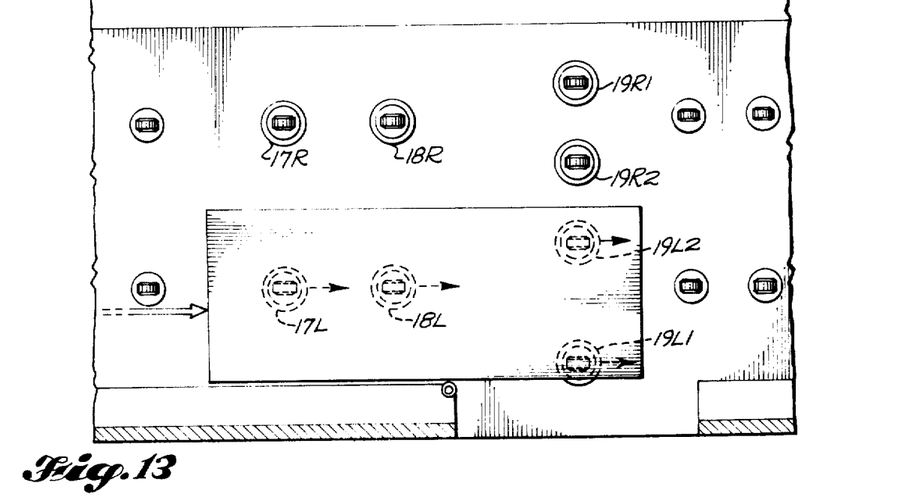

FIGS. 8 through 13 are included for completeness and each illustrate a conventional rectilinear movement of a cargo unit including forward left lane, FIG. 8; lateral left to right, FIG. 9; forward in the right lane, FIG. 10; aft in the right lane, FIG. 11; lateral right to left, FIG. 12; and aft in the left lane, FIG. 13; all motions use the eight specialized PDU's. In fact, whether or not the cargo unit is in the left or right lane is of small consequence, so that the six motions of FIGS. 8 through 13 may be and are covered by Commands 3, 4, 6 and 7 of TABLE 1.

Figure 14:
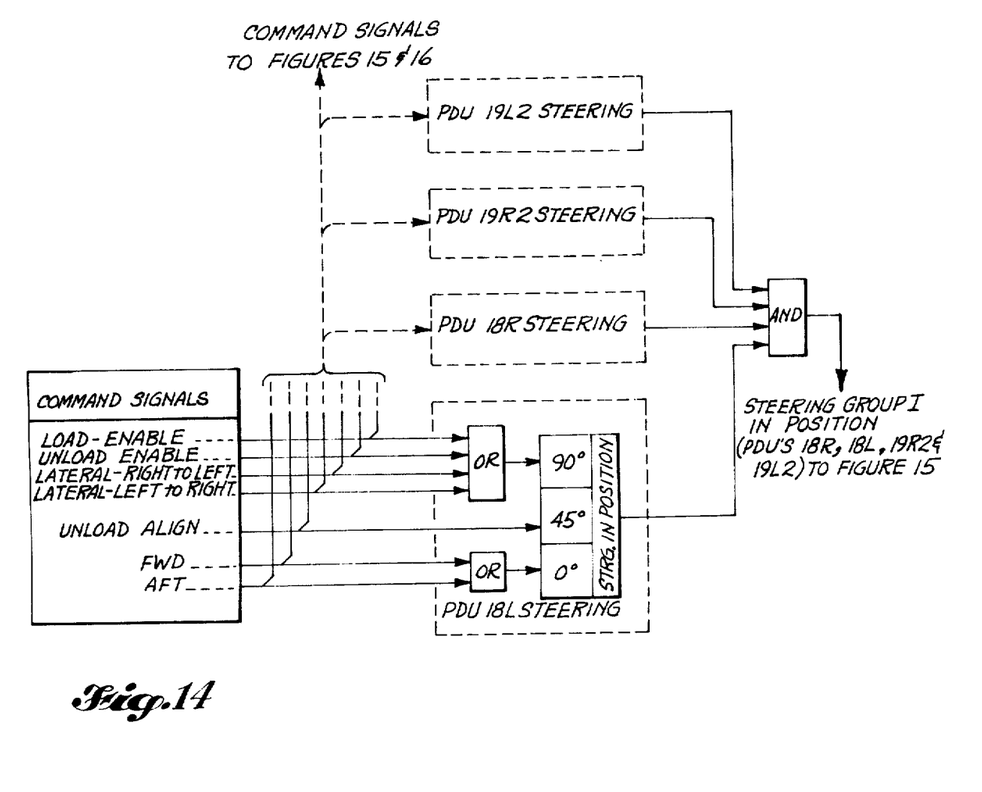
FIGS. 14, 15 and 16 diagram the logic of the control of the twenty foot long units during loading and unloading.
Figure 15:
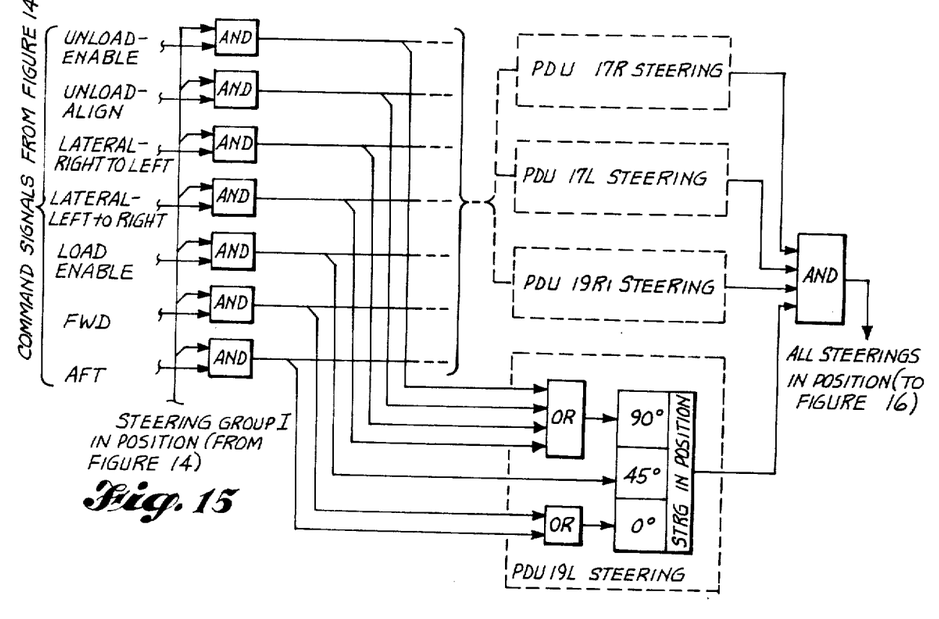
Figure 16:
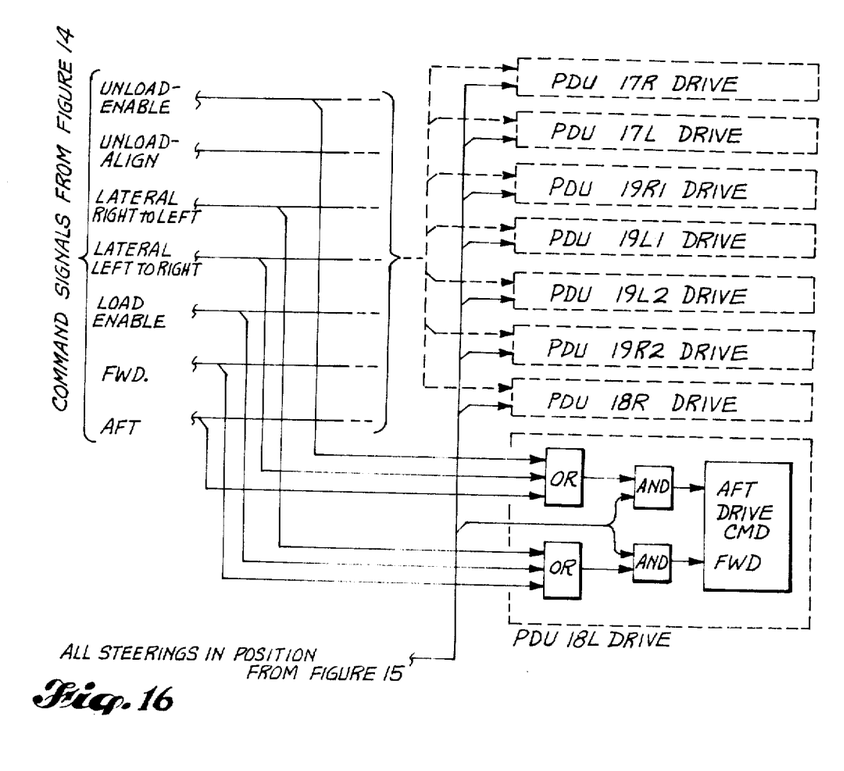
Figure 17:
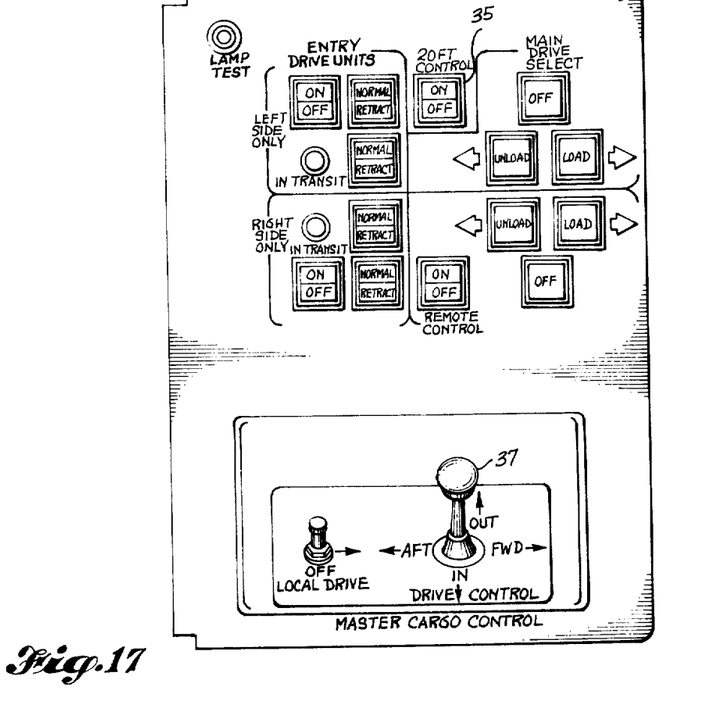
FIGS. 17, 18, 19 and 20 illustrate the arrangement of the control panels for the system.

FIGS. 14, 15 and 16 constitute the diagram of a straightforward embodiment of the logic selected for the methods and apparatus. As is well-known to persons skilled in this art, an AND Gate is a logic circuit which has two or more signal inputs, and all signal inputs have to be present in order to get a signal output. An OR Gate is a logic circuit which has two or more signal inputs and if either one or more of the signal inputs is present, there is a signal output.

FIGS. 17, 18, 19 and 20 show the control panels for controlling the apparatus and exercising the logic. The logic and content are discussed below.

Since the eight PDU's in the V section of the airplane must function conventionally for 8 foot by 10 foot units and as disclosed herein for 8 foot by 20 foot units, the controls for handling 20 foot units are separate and must be activated in place of the conventional controls when needed. Switch 35 on FIG. 17 activates and deactivates the controls for the 20 foot long units.

For logic and control purposes the eight PDU's are divided into two groups. The divisions of PDU's into two groups provides a means of maintaining the cargo unit position during the interval when PDU's are steering to the command position. Group 1 includes PDU's 18L, 18R, 19L2 and 19R2. These are the PDU's located more to the center of the cluster. Group II includes 17R, 17L, 19R1 and 19L1. The logic is arranged so that when a command is signalled, the Group I PDU's follow their steering requirements immediately and Group II does not steer until a signal is generated to show that Group I steering is complete. This logic is diagrammed on FIG. 14.

When Group I is steered, Group II then steers and the wheel rotation signals cannot be executed until it is signalled that all steering is completed. This logic is diagrammed on FIG. 15.

Once steering is complete the drive wheels are powered and the signalled operation takes place. This logic is diagrammed in FIG. 16.

Since the actual operations of the controls to produce the commands are involved because of factors such as requiring two operators to work simultaneously for safety reasons and since the invention can be practiced with any reasonable system for producing the commands, the control system is discussed in general.

Figure 20:
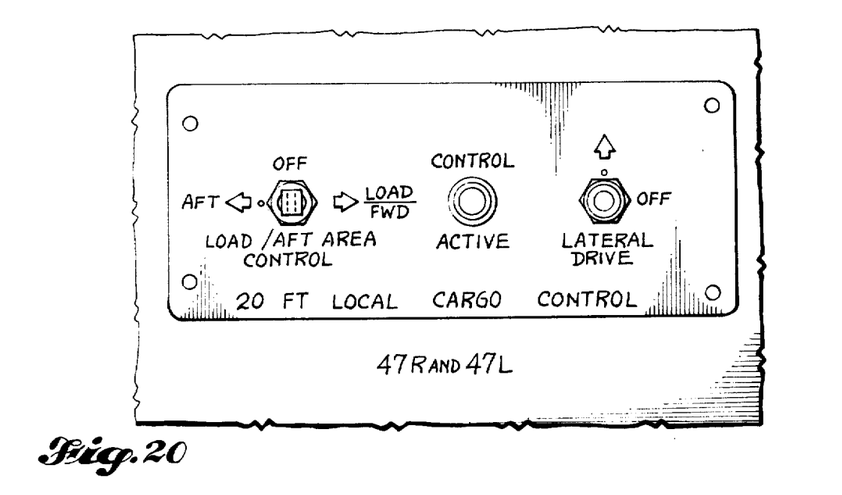

There are five control stations and six panels involved at the locations shown on FIG. 2 as follows:

At each of the locations indicated by squares labeled 47L and 47R there is a "20 foot local" control panel as illustrated in FIG. 20.

Figure 19:
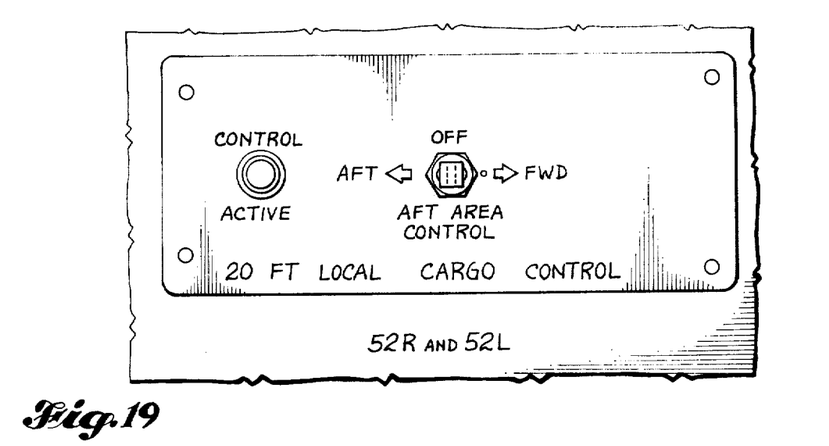

At each of the locations indicated by squares labeled 52R and 52L there is a 20 foot local control panel as shown in FIG. 19.

Figure 18:
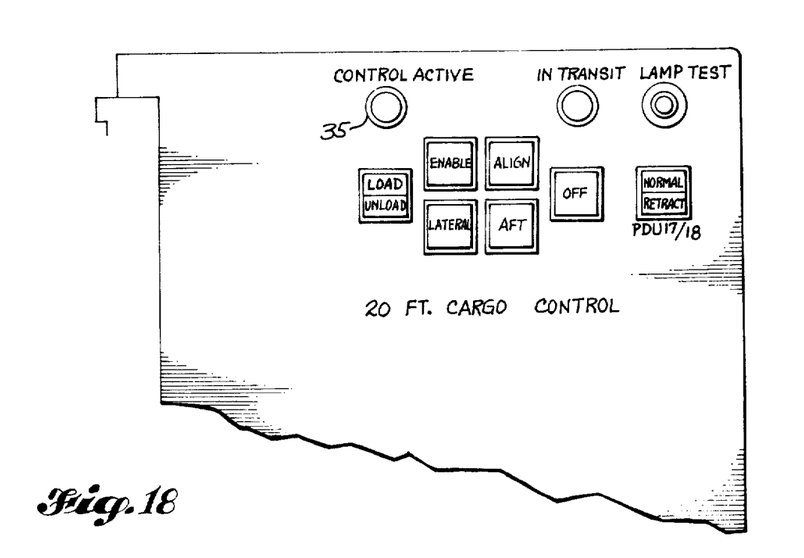

At the location labeled 50L there is a Master Cargo Control panel as shown in FIG. 18, and, in conjunction, a 20 foot Cargo Control (Master), FIG. 19 (hereafter called the 20 foot panel).

To produce a Load-Enable command, an operator at 50L first pushes the 20 Foot Control button 35 on. He then pushes the Load and Enable buttons on the 20 Foot Panel. He then moves the drive control "joystick" type switch 37 to the "In" position and holds it there against spring pressure. A second operator at a 20 Foot Local Control panel 47L or 47R moves an Aft Area Control Switch to the Forward position and holds it against spring pressure. With this switching procedure, functioning through the described logic, the Load-Enable maneuver is performed. When the operators observe that it is complete they release the spring loaded switches and the system is ready for the next maneuver.

To produce the Load-Normal (or Lateral — Left to Right) command the operator at the 20 Foot Panel pushes the Lateral button, to provide a steering input and the operator at a 20 Foot Local Control panel operates the lateral drive switch from the panel 47R on the side of the airplane toward which the cargo unit will move, in this case, the right side, to produce a power signal.

An Unload-Normal (or Lateral — Right to Left) command is produced in the same way except that the local signal is switched from the left side 20 Foot Local panel 47L.

The Unload-Enable command is produced when an operator at the 20 Foot Panel pushes the Unload and Enable buttons and then moves the joy-stick switch 37 to the "Out" position and holds it against spring pressure until the maneuver is complete.

The Unload-Align command is produced when an operator at the 20 Foot Panel pushes the Unload and Align buttons and holds the joy-stick switch 37 to the out position until the maneuver is complete.

Forward or Aft commands are produced when operators at each of two 20 Foot Local panels each move an aft area control switch simultaneously to either the forward or aft position.

The methods and apparatus described clearly meet the objectives of the subject invention. Equipment and space originally designed to accommodate cargo units 8 feet wide and 10 feet long has been adapted to rapidly, safely and easily handle units of the same width and 20 feet long. The adaptation involves the loading and unloading maneuvering methods which are based on the use of a specially located pivot-stop. One embodiment of the invention has been described and it is recognized that alternate embodiments not departing from the essence of the invention can be conceived, along with variations of the one described. Accordingly, this invention is to be limited only by the scope of the appended claims.

What is claimed is:

1. In a cargo carrying airplane having a floor adapted to carry cargo containers which are longer than the width of the cargo floor, and having a side loading cargo doorway having a forward edge, and having an attenuated pivot-stop disposed at the forward edge of the doorway and protruding above the floor, the cargo floor having disposed therein a plurality of steerable, reversible, retractable, extendible cargo drive rollers including a first, second, third and fourth of the cargo drive rollers being disposed in a line across the width of the cargo floor at a first body station at the center of the doorway and spaced substantially equally from each other and the sides of the floor, the fifth and sixth of a cargo drive rollers being disposed at a second body station forward of the first station by a distance approximately one-half of the floor width, each of said fifth and sixth rollers being located inwardly from a side of the floor by a distance approximately one-fourth of the floor width, and a seventh and eighth of the cargo drive rollers at a third body station forward of the fifth and sixth cargo drive rollers by a distance approximately one-third of the floor width, a method of loading the cargo containers comprising the steps of:

steering said first, second, third and fourth cargo drive rollers in an athwartship direction perpendicular to the longitudinal axis of the fuselage;

powering said first, second, third and fourth rollers to drive a cargo container into the airplane and across said floor;

steering said drive rollers so that the three of said first, second, third and fourth rollers farthest from said doorway are aligned in a direction parallel to the longitudinal axis of the fuselage and retracting the fourth of said drive rollers which is the drive roller nearest the doorway and so that the sixth drive roller which is the drive roller of said fifth and sixth drive rollers farthest from the doorway is aligned in said parallel direction and said fifth drive roller is aligned in said athwartship direction, and so that said seventh and eighth drive rollers are aligned in said athwartship direction; powering said rollers so that said rollers aligned in said parallel direction are driving forwardly, and so that said rollers in said athwartship direction are driving towards the side of the fuselage adjacent said doorway, so that the cargo container is driven against said pivot-stop and is pivoted around said pivot-stop so that the length of said cargo container is aligned fore and aft and positioned on the side adjacent said doorway half of said cargo floor; and moving said cargo container into its intended location on said floor.

2. In a cargo carrying airplane capable of carrying at least one cargo container which is longer than the width of the cargo floor, having a side loading cargo doorway having a forward edge, and having an attenuated pivot-stop at the forward edge of the doorway and protruding above the floor, the floor having disposed therein a plurality of steerable, reversible, retractable, extendible cargo drive rollers, including four drive rollers, a fifth drive roller, a sixth drive roller, a seventh drive roller and an eighth drive roller, said four drive rollers being disposed in a line across said cargo floor equally spaced from each other and the sides of said floor at the center of said doorway, said fifth and sixth drive rollers being disposed at a body station forward of said four drive rollers by a distance approximately one-half of said cargo floor width, said fifth drive roller spaced approximately one-fourth of said cargo floor width from the side of the floor adjacent said doorway and said sixth drive roller spaced approximately one-fourth of said cargo floor width from the opposite side of said cargo floor, said seventh and eighth drive rollers being disposed and spaced at a body station forward of said fifth and sixth drive rollers by a distance approximately one-third of the cargo floor width, said seventh drive roller spaced approximately one-fourth of said cargo floor width from the side of the floor adjacent said doorway and said eighth drive roller spaced approximately one-fourth of said cargo floor width from the opposite side of said cargo floor, a method of unloading said cargo container comprising the steps of:

positioning said cargo container adjacent said doorway;

steering said drive rollers so that said seventh drive roller is aligned in an athwartship direction perpendicular to the longitudinal axis of the airplane fuselage, said eighth drive roller is aligned in a direction parallel to the longitudinal axis of the fuselage, said fifth driver roller is aligned in said athwartship direction said sixth drive roller is aligned in said parallel direction, and the one of said four rollers farthest from said doorway is retracted and the other three of said four rollers are aligned in said athwartship direction;

powering said rollers so that said fifth and seventh drive rollers drive inboard and said sixth and eighth drive rollers drive aft, and so that said three of said four drive rollers drive towards the doorway so that said cargo container is rotated about said pivot-stop to a position substantially straight across the floor and projecting through said doorway;

re-steering said four rollers to be aligned in said parallel direction;

powering the three drive rollers of said four rollers farthest from said doorway to drive aft so that the cargo container is positioned directly across said floor and aligned centrally in said doorway;

re-steering said four rollers to be aligned in said athwartship direction; and;

powering said four rollers to drive towards the doorway so that the cargo container is moved endwise through said doorway.

* * * * *